April 24, 1951     J. R. VICKERY     2,549,868
BRAZING MACHINE Filed July 27, 1944     5 Sheets-Sheet 1

Fig. 1.

INVENTOR
JOHN R. VICKERY
BY
ATTORNEYS

April 24, 1951

J. R. VICKERY 2,549,868

BRAZING MACHINE

Filed July 27, 1944

INVENTOR
JOHN R. VICKERY.
BY
Blair Curtis & Hayward
ATTORNEYS

Fig. 4.

INVENTOR
JOHN R. VICKERY.
BY
ATTORNEYS

April 24, 1951  J. R. VICKERY  2,549,868
BRAZING MACHINE
Filed July 27, 1944  5 Sheets-Sheet 5

INVENTOR
JOHN R. VICKERY
BY
ATTORNEYS

Patented Apr. 24, 1951

2,549,868

UNITED STATES PATENT OFFICE 2,549,868

BRAZING MACHINE

John R. Vickery, York, Pa., assignor to Aircraft-Marine Products Inc., Harrisburg, Pa., a corporation of New Jersey Application July 27, 1944, Serial No. 546,835

6 Claims. (Cl. 113—59)

This invention relates to brazing machines and processes and to articles made thereby, particularly to a machine for automatically brazing the ferrule seam of an electric terminal in which the ferrule is formed by rolling up a flat blank and bringing the ends close together in a butt seam. Terminals for electrical conductors having rolled ferrules have long been used but are open to the objection when crimped onto the end of a wire or cable, etc., that the seam is apt to spread open at the point where the rolled edges abut, unless carefully designed dies are used with the seam properly oriented in the dies.

The present invention aims to provide a machine by which the seams in rolled ferrules can be quickly closed and the edges permanently united thus providing a ferrule having all the advantages of one made by deep drawing or extruding, etc., while retaining the recognized advantages of a ferrule made by stamping and rolling up from flat sheet or strip.

A further object of the invention is to effect the brazing of a seam simultaneously with a heat treating in the same operation.

A further object is to produce a rolled ferrule terminal connector, and particularly those made of copper, in which the ferrule is fully annealed so as to be suitable for crimping while the tongue or terminal connector part of the terminal retains the properties and crystalline structure developed therein during cold working of the metal.

To this end the invention contemplates so holding the terminal connector to be brazed with its tongue between relatively cold metal jaws of relatively high heat capacity while the ferrule is heated to a temperature suitable for brazing that by reason of the rapid conduction from the tongue into the metal jaws, the tongue is kept below the temperature at which its crystal structure would be radically changed.

A further object of the invention is so to bring the ferrule and brazing material into contact with each other that a complete brazing of the seam and the filling of any cavities or depressions in the abutting edges will be brought about. To this end the invention contemplates first heating the ferrule to a temperature at which it will effect a quick fusion of the brazing material, and then presenting the brazing material to the seam, advantageously in the form of a wire or other strip, in such manner that it extends lengthwise of the seam and parallel to it so that it is brought into contact with the ferrule throughout the length of the seam, thus insuring complete filling of the seam and any recesses, depressions or cavities therein, and automatically melting off from the wire or other strip just the amount of brazing metal required for the seam.

An important feature of the invention is in controlling the feeding of the brazing material into a position where it is contacted by a heated ferrule, by means of the ferrule itself, thus preventing excessive feeding of unused brazing material in the event that one or more ferrules should be omitted from a series approaching the brazing point.

Another important feature of the invention is the control of the delivery of terminals to the clamping jaws by the movement of the jaws into receiving relation to a raceway and their closing by movement away from the raceway.

Other objects and important features of the invention to which reference has not been made hereinabove will be apparent when the following description and claims are considered in connection with the accompanying drawings.

Although in the accompanying drawings I have shown a preferred embodiment of my invention and have described the same and suggested various modifications thereof in this specification, it is to be understood that these are not intended to be either exhaustive or limiting of the invention, but, on the contrary, are chosen for the purposes of illustrating the invention in order that others skilled in the art may so fully understand the invention, its principles and the application thereof, that they may embody it and adapt it in numerous forms, each as may be best suited to the requirements of its particular use.

In the illustrative embodiment of the invention the mechanism for presenting the terminals successively to the brazing means, heating them and applying the brazing material are all mounted on a common frame which, as shown, is made up of two pairs of vertical angle bars 2 and 4, constituting the legs and upright main frame members of the machine, cross angle bars 6 and 8, connecting the vertical angle bars 2 and 4 and forming supports for further pairs of front and rear vertical angle bars 10 and 12, longitudinal bars 14 and 16, connecting the vertical angle bars 2 and 4 at their tops, crossbars 18 and 20, connecting the two vertical angle bars 2 and 4, and, on each side of the machine, a shelf 22, which serves as support for the driving motor 24 and for the transmission housing 26.

The housing 26 may have therein any suitable speed reducing transmission, e. g., as a worm and worm wheel (not shown), for driving the shaft 28, which has fixed thereon the V-belt pulley 30 by which the mechanism, hereinafter to be described, is driven. Also supported on the crossbars 22 is a reel 32 from which is drawn the wire 34 of brazing material, for example any suitable commercial brazing alloy, advantageously of the self-fluxing type which readily wets the solid metal and runs into the capillary crack between the abutted edges. A suitable alloy for the purposes of the present invention is composed of 15% silver, 80% copper and 5% phosphorous, i. e. about 2.5% less phosphorous than the silver-copper-phosphorous eutectic.

The carrier for the terminals to be brazed comprises, as shown, a rotatable carrier disc having a notched periphery and also having peripherally extending grooves, at least in the clamping portions of the serrations. This carrier 36 is mounted on a shaft 38 having its bearings in bearing supports 40 and 42 bolted upon the respective crossbars 14 and 16. The carrier 36 is keyed or otherwise fixed to the shaft 38 to turn therewith. Also keyed or otherwise fixed to an extension of the shaft 38, beyond its bearing 42, is a ratchet wheel 44 by which the carrier 36 can be intermittently turned to bring successive clamps into the various operative positions necessary to perform the functions of the machine.

The V-belt driving pulley 30 is connected by the V-belt 46 to a larger V-belt pulley 48 on a shaft 50 having its bearings in bearing supports 52 and 54 bolted upon the respective crossbars 14 and 16. The pulley 48 is keyed or otherwise connected to the shaft 50 to turn therewith. On an extension of the shaft 50 beyond the bearing member 54 is keyed a pitman wheel 56 having therein a crank pin 58 for reciprocating the pawl-operating bar 60. At its upper end the pawl-operating bar or connecting rod 60 is pivotally connected at 62 to a pawl-carrying rock-arm 64 arranged to rock about the shaft 38 so that its rocking movement is concentric with the rotation of the ratchet wheel 44. A pawl 66 is pivoted at 67 on the rock-arm 64 and the pawl is urged into engagement with the successive teeth of the ratchet wheel 44 by a spring 68 connected at one end to a pin extension on the pawl and at its other end to pin 69 carried by the rock-arm 64.

The carrier 36 has mounted thereon a succession of clamps which cooperate with the surfaces of the notched edge and with the grooves therein, to clamp the terminals which are to be brazed and hold them in the successive positions where they are operated upon when the carrier is rotated step-by-step. Each of these terminal clamps comprises a nose portion 70, adapted to be received within the opening 126 in the terminal clamped thereby, the nose preferably also entering the groove 74 in the clamping face of the carrier. The nose 70 is formed on the centered arm 76 of a bellcrank 78 fixed to a short shaft 80 extending through a bearing hole in the carrier 36, the other arm 82 of the bellcrank (shown in broken lines in Figure 2, since it lies behind the carrier 36) extends toward the center of the carrier 36 and is arranged to be engaged by a cam 96 hereinafter to be described. On the front side of the carrier, as viewed in Figure 2, is the third arm 84 of the bellcrank 78, this arm being connected by a spring 86 to a flange 88 at the hub of the carrier 36.

The spring 86 tends to hold the nose 70 in clamping relation to the notched face of the carrier 36, except when the arm 78 is moved out of such clamping relation by engagement of the arm 82 with the cam 96 hereinafter to be described. The arm 84 is also provided with an upper face 92 for a purpose hereinafter to be set forth.

Figure 2:
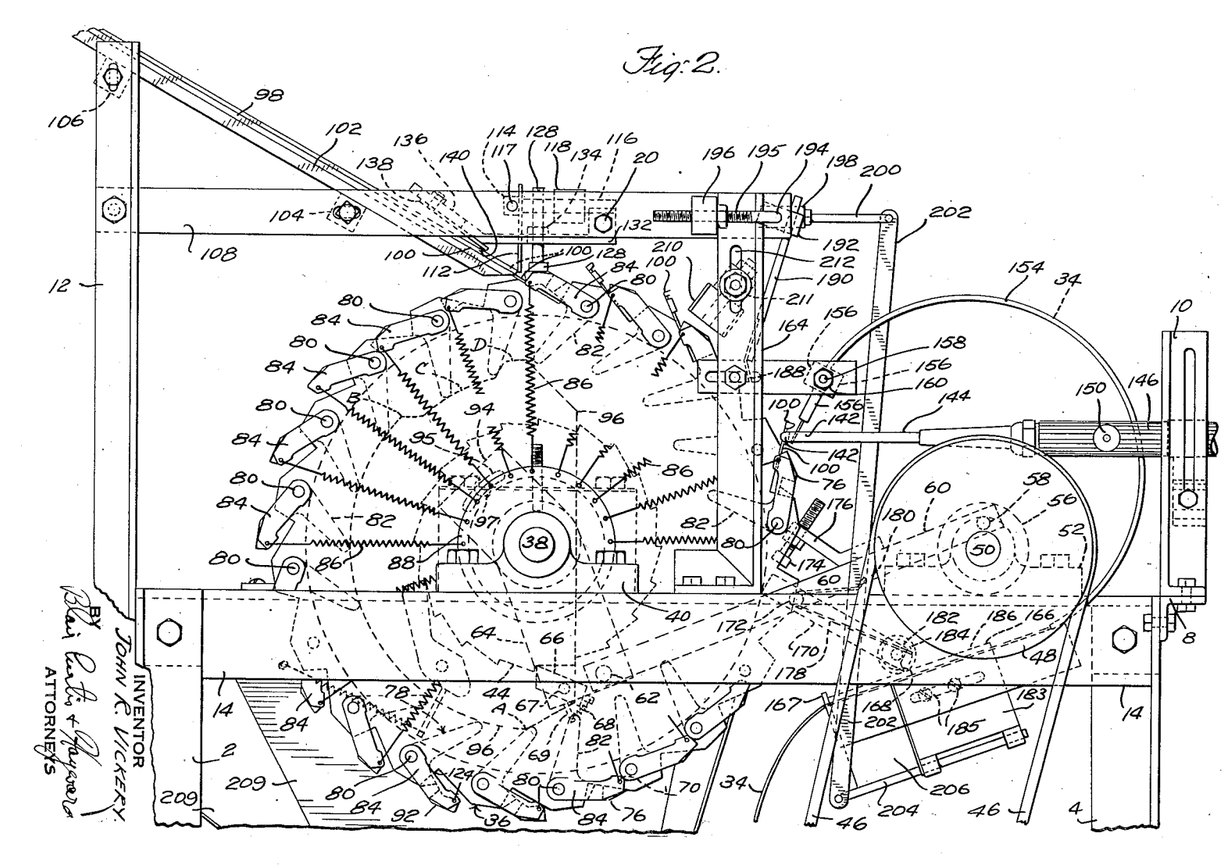
Figure 2 is a fragmentary elevation taken from the opposite side showing various hidden parts in broken lines.
Figure 3:
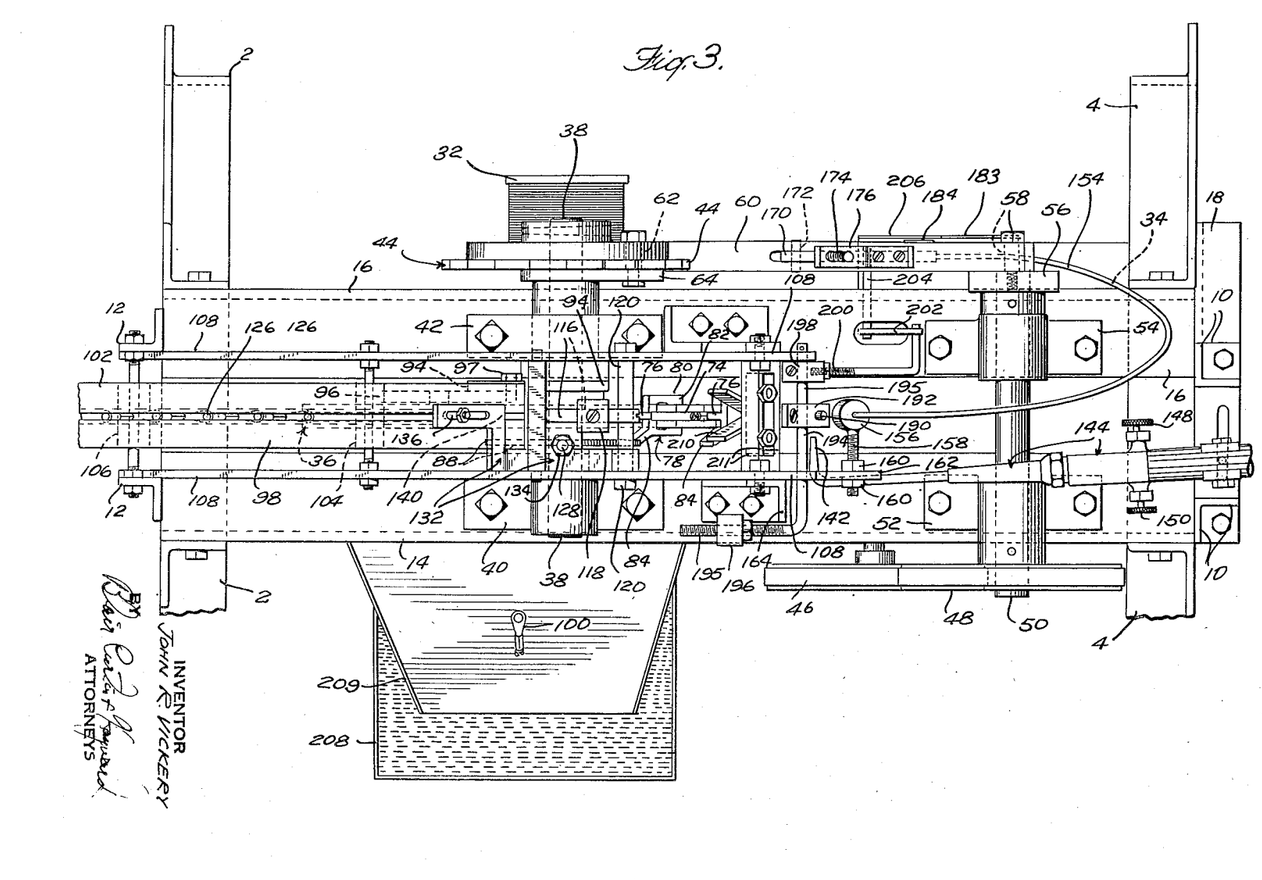
Figure 3 is a top plan view of the machine shown in Figure 1.

An arm 94 on the rocker arm 64 carries a cam 96, shown in broken lines in Figure 2, this cam being adjustable on the arm 94 by means of the slot 95 through which passes the clamping bolt 97. It will be seen that the high part of the cam begins at the point A in Figure 2 and extends to the point B, beyond which there is a short valley C and then another high dwell D. The purpose of the dwell D is to open the terminal clamp, preparatory for reception of a terminal. Beyond the dwell D the cam 96 releases the arms 82 in turn so that the arm 78 of each is pulled down by its spring 86 and thereby holds a terminal 100 clamped under its nose 70 until the carrier 36 has made a half turn, when the arm 82 again meets the cam 96 and is swung out at the point A, so as to release the arm 78 and drop the terminal into the chute 209.

By reason of the mounting of cam 96 on the arm 94, it moves forward with the carrier 36 and thus the cam actions just described occur only on the return stroke of the ratchet crank 64—95 when the carrier 36 is at rest.

A raceway 98, shown more clearly in Figure 2, is provided for feeding the terminals 100 successively into the clamps on the carrier 36. This raceway comprises as its floor an inclined bar or frame member 102 adjustably connected by lugs 104 and 106, respectively, to crossbars 108 and vertical bars 110 of an upper frame. This mounting of the raceway 98 provides for gravity feed of the terminals into position to be introduced into the successive terminal clamps on the carrier 36.

At the bottom of the raceway 98, the terminals 100 strike the retaining and releasing finger 112 on the weighted bellcrank 114 pivoted at 117. Both the finger 112 and the weight 118 are adjustable to adapt the mechanism for feeding of different terminals. The weight 118 on the arm 116 serves to return the member 112 to its operative terminal-retaining position after each feeding operation. The downward movement of the arm 116 is limited by a shaft 120.

From the foregoing description it will be seen that, when one of the terminal clamps comes under the terminal retainer 112, in the rotation of the carrier 36, its arm 82 is in the valley C of cam 96 so that the bell crank 78 can pass under the arm 112 without disturbing its position. When the step movement is complete, the arm 84 is under the bolt 128 on the stop arm 132; and, therefore, when the return movement of the cam brings the high point D under the arm 82 of the bellcrank 78 to open the terminal clamp at 70, the action is also transmitted to the stop arm 132 thus releasing the line of terminals held by the pin 140, thus allowing the lowermost terminal to drop into position under the clamping nose 70 on the arm 76. This position is established by the finger 112.

As the cam 96 moves to the end of its return stroke, the dwell D passes out from under the arm 82, whereupon the arm 76 drops and its nose 70 engages in the eye 126 of the terminal 100. At the same time the arm 132 drops back to its normal position so that its stop-pin 140 is in front of the ferrule of the next terminal 100, so that the column of terminals is held above the pin 140 until after the next step movement. When the spring 86 closes the clamp 78, this closing causes the nose 70 on the clamp to enter the opening 126 in the tongue of the terminal, and thus not only to clamp it firmly upon the carrier, but also so to locate it that its ferrule will be in proper position for the brazing operation.

The retainer 112, being held only by the weight 118, rides over the terminal 100 and then moves back to operative position by action of the weight 118, when the carrier 36 is rotated to the next step.

Figure 1:
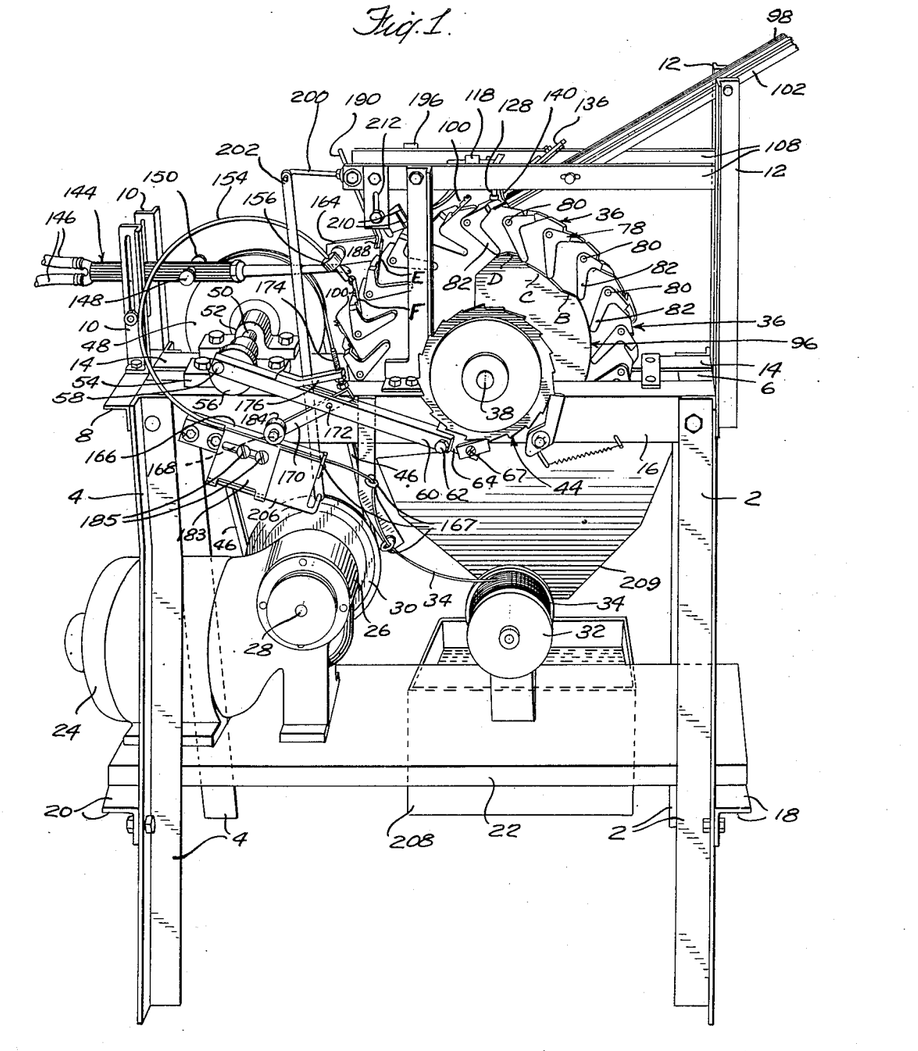
Figure 1 is a side elevation of a machine embodying the present invention for use in brazing the ferrule joints of electric conductor terminals.

The bolt 128, as shown, is adjustably screwed into the lever 132 and secured by a lock nut 134. The lever 132 is fulcrumed upon the stationary shaft 120 and is bent upwardly at its left hand end, as seen in Figure 1, so that this upwardly bent end is approximately parallel to the raceway 98. This end of the lever 132 is also slotted, as shown at 136, to provide for the adjustment of a slide 138 mounted thereon. The slide 138 is provided near its lower end with a retaining pin 140 arranged to hold back in the raceway 98 the terminal which is next above the one retained by the retainer 112. It will be seen that this retaining pin 140 still retains the terminal 100 which is next above the one on the retainer 112, when the latter terminal is moved out from the raceway 98 by further movement of the carrier 36.

The terminal, which has been fed into the clamp in the manner described and which has been clamped on the carrier 36, as shown in the upper part of Figure 2, is carried in the stepwise movement of the carrier 36 first past the funnel guide 210, where any misalignment of the terminals is corrected, and at the next step into the position, shown at E in Figure 1, in which the terminal strikes the feeler 188 for the purpose more fully explained below. The next step of the carrier 36 brings the ferrule of the terminal to the position F where it is heated by the fixed torch 144.

It will be noted that the clamping of the terminal in each of the clamps is done in such a way that the tongue is held flat against the sloping face of the notch in the carrier 36 while the ferrule projects out beyond the periphery of the carrier and is thus freely exposed to the concentrated flame of the torch 144, the nozzle of which is shown at 142. This torch, shown, may be of a type well known and commonly used for brazing and welding. Gas is supplied by a flexible hose 146, and valves 148 and 150 serve to control the flame to concentrate it on the ferrule. This flame is advantageously of a slightly reducing character to prepare the surface for the brazing material.

As shown particularly in Figure 2, the flame of the torch 142 is directed against the ferrule of the terminal 100, which is at rest in front of it so long as the carrier 36 is at rest between its successive step movements. The torch is, however, so adjusted that this will be sufficient to heat the ferrule of the terminal to a brazing and annealing temperature, e. g. above about 1300° F.

The brazing material 34, which is to be used to braze or solder together the two edges of, and to seal the seam in, the ferrule of the terminal 100, is in continuous strip form, advantageously a wire. This wire 34 is guided through a tube 154 into a position in the path of and parallel with the seam, as the terminal moves on the carrier 36 away from the heating station F. At its other end the tube 154 receives the wire 34 from a feeding device. The end of the wire-guiding tube 154 which is adjacent to the point of use is held in a holder 156 having a threaded stem 158 arranged to be locked in the desired angular position by nuts 160 in a bracket arm 162, adjustably connected to an upright angle bracket 164 bolted to the cross-bar 14 of the main frame. The lower end of the tube 154 is mounted on a feeding table 166 bolted to the crossbar 14. The wire 34, beyond this tube, passes through guide eyes 167 from the reel 32, and across the table 166. The wire is fed step-by-step into the tube 154 by the knife-like end 168 of a feeding dog 170 pivoted on the connecting rod 60.

As shown in Figure 2, the connecting rod 60 is slotted and the feeding dog 170 is pivoted at 172 in said slot, a portion of this feeding dog 170 extending above the connecting rod 60 where it may be engaged by an adjustable stop 174 threaded through a bracket 176 mounted upon the upper side of the connecting rod 60. The stop 174 limits the movement of the dog 170 about the pivot 172, when the dog 170 is picked up off the table 166. Since the crank pin 58 on the return stroke moves away from the table 166, the dog 170 is held away from the wire 34, and therefore cannot drag it backward. A spring 178, which is coiled about the pivot 170, and connected at one end to the connecting rod 60, as shown at 180, and at its other end to a pin 182 on the dog 170, holds the knife 168 against the table 166 during the feeding operation.

The pin 182 also serves as a pivot for a cam follower 184 on the dog 170. The purpose of the cam wheel 184 is to hold the dog 170 out of feeding relation to the wire 34 on the table 166 at the end of its feeding stroke and when there is no terminal being fed into position to be brazed.

The plate 183 at the edge of the table 166 provides a cam or track for the wheel 184; and this plate is adjustably mounted on the table by bolts 185 received in slots so that the cam slope 186 will engage the wheel 184 earlier or later in the travel of the dog 170 so as to feed a shorter or longer portion of the wire 34.

It will be seen that ordinarily the reciprocating movement of the connecting rod 60 will carry the dog 170 up beyond the releasing cam 186 whereby to lift the knife 168 from the wire 34; and that the action of the spring 178 will tend to move the knife edge 168 into engagement with the wire 34 to effect the feed thereof. This engagement of the knife edge 168 with the wire will be only sufficient to cause it to bite lightly into the wire for feeding purposes, without severing or cutting through the wire.

If no terminal is about to come into brazing position, it is, of course, not desirable that the wire be fed. To prevent the feeding of the wire a feeler 188 has been provided at the next station ahead of that at which heating occurs. This feeler 188 is so connected to the wire-feeding mechanism that, if the feeler 188 be not engaged by the ferrule of a terminal about to be moved into the heating position F, the dog 170 will be held out of feeding relation to the wire, or vice versa, and no length of brazing wire will be fed.

As shown in Figures 1 and 2, the feeler 188 is mounted on an arm 190, held in a clamping head 192 by which it may be adjusted on a shaft 194 and clamped in the proper angular position required for a given size terminal. The shaft 194 has its bearings in the upper frame members 108; and, as shown particularly in Figure 2, the forward end 195 of the shaft 194 is bent at right angles to form a crank arm which is threaded to receive an adjustable counterweight 196 by which the weight of the connections 200, 202, 204, etc., now to be described may be almost, but not quite, counterbalanced. Also secured to the shaft 194 by a clamping head 192, is an arm 200 which, with the arm 190 forms a bellcrank lever. The arm 200 is bent rearwardly, as shown in Figure 2, to permit its connection with a link 202 by which connection is made between the arm 200 (and through it with feeler 188) and the end of crank arm 204 which forms the hinge pin on a plate 206. This hinge pin, as shown, is pivoted on plate 183 so that the two plates can be aligned to provide a track for the wheel 184 and thus hold the knife edge 168 above the wire, or plate 206 is swung away when the feeler 188 is held out by a ferrule, and thus the knife edge is allowed to drop into the wire to effect feeding thereof on the return stroke of the connecting rod 60.

When, however, the parts are in position shown in Figure 2, that is, with no terminal in position in the clamp adjacent to the feeler 188, the counterweight 196 is preferably so adjusted on the threaded angular extension 194 of the shaft 195 that it almost counterbalances the pull of the link 202 and the parts connected therewith, but leaving enough unbalanced pull to swing the plate 206 against the table 166 when the feeler 188 finds no terminal on the carrier 36. If, however, the ferrule of a terminal be moved forward toward the brazing position, beneath the feeler 188, on the step movement of the carrier 36, then the feeler 188 will rock the bellcrank, formed by the arm 190 and the arm 200, in a counterclockwise direction (as seen in Figure 2) and thus pull the link 202 upwardly and swing the plate 206 out of the path of the wheel 184, so that the knife edge 168 can drop into engagement with the wire 34 on the back stroke of the connection rod 60. A length of the brazing wire 34 will thus be pushed into position to be used, this feeding of the wire 34 taking place after the movement of the carrier 36 which brings the terminal into the brazing position and while the ferrule is being heated to brazing temperature.

The brazing wire 34 is projected into the path of the ferrule in a direction such that it is approximately parallel to the seam when it is contacted by the ferrule, but advantageously at a slight angle so that its end touches the seam first and it is bent progressively, holding all parts of the wire against the seam until it is progressively fused by contact with the hot ferrule.

The feeler 188 may be sufficiently long so that plate 206 is held out until roll 184 is in feeding position on the table 166, or the stop 174 may be adjusted so that wheel 184 is held just below the edge of the plate 206 so that it cannot come into alignment with plate 183 until the wheel 184 passed up the cam slope 186.

The ferrule of the terminal 100, after having been heated to a red heat during its dwell in the position in front of the heating torch 142, will then be carried away from the flame of the torch 142 by the next step rotation of the carrier 36. As the carrier starts to turn, the heated ferrule of the terminal 100 engages a portion of the wire 34 which projects beyond the upper end of the tube 154, this contact being directly at the joint where the edges of the wings of the terminal blank are butted together to form the ferrule. The red hot ferrule quickly fuses off the required length of the brazing wire and the brazing of the joint will at once be effected.

The time of the step rest at the station F and the intensity of heating by the flame from the torch 144 are set to bring the ferrule to a suitable annealing temperature above the flow point of the brazing metal, and the number of steps to the release station A, where the terminals are dropped into a quenching bath is chosen to give an appropriate period for the readjustment of grain structure required for annealing.

It will be noted that the heating of the terminal is localized in the ferrule both because the tongue portion of the terminal is held against the cool periphery of the carrier 36 and because the ferrule is held laterally outward from and above the tongue, while the flame is concentrated and directed across the ferrule only. Thus the work-hardening of the tongue, and of any parts associated therewith, is substantially retained even though the ferrule is annealed to a dead soft condition.

As shown in Figure 2, when the carrier 36 has rotated so as to bring the brazed terminal to the station adjacent the high point A on the cam 96, the arm 82 of its clamp rides up onto the high part A of the cam 96 and thus effects the release of the terminal. When the clamp 70 is thus opened, the released terminal will drop out of the carrier onto the chute 209 and thence into a quenching tank 208.

In order that each terminal 100 may have the seam of its ferrule properly aligned with the brazing wire 34, as it comes into contact therewith, a pair of funnel guides 210 are arranged in a V, tapering from a wide mouth to a narrow exit just wide enough to pass a properly aligned terminal ferrule. Thees guides, being arranged beside the path of travel of the terminals, serve to align each terminal accurately, as it is moved through the V between the guides shortly before the ferrule reaches the point at which it is heated for the brazing operation. As shown, this straightening device 210 consists of guide plates on bolts adjustably attached to the crossbar 211, which in turn is adjustably bolted through slots 212 to the vertical bar 164 of the upper frame.

Figure 4:
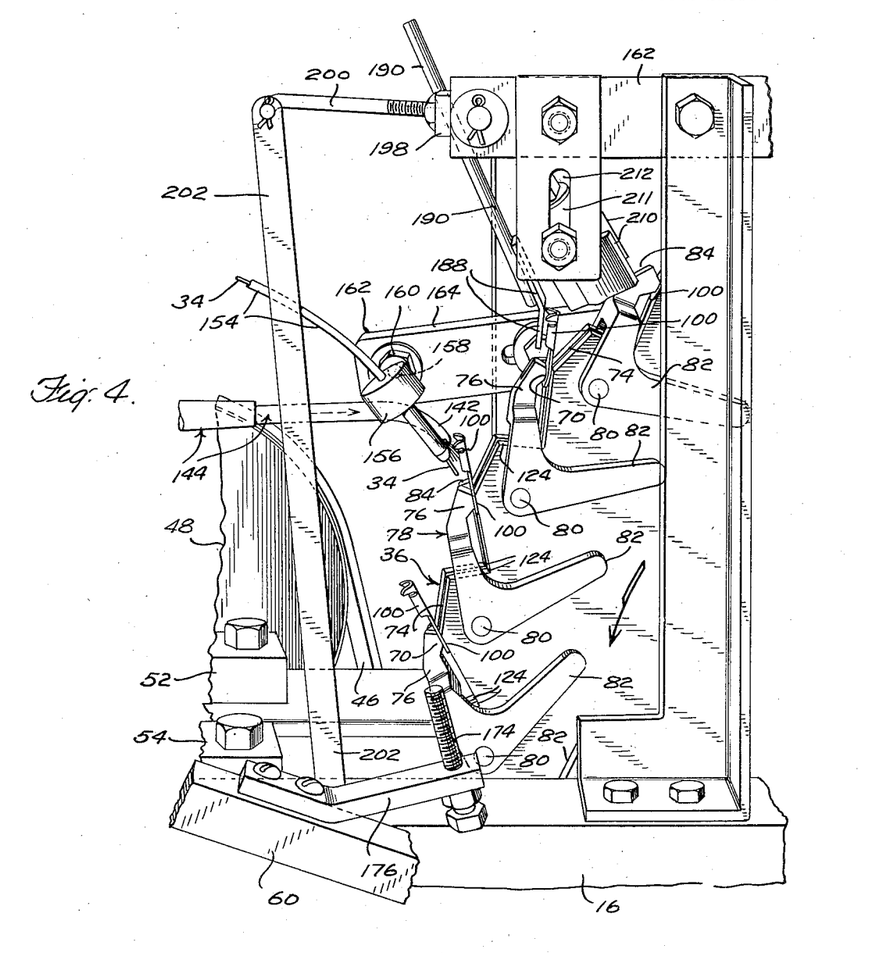
Figure 4 is a fragmentary view in perspective showing a portion of the carrier disc and adjacent parts relating to the final orientation of the work in the clamp and the actual brazing operation.
Figure 5:
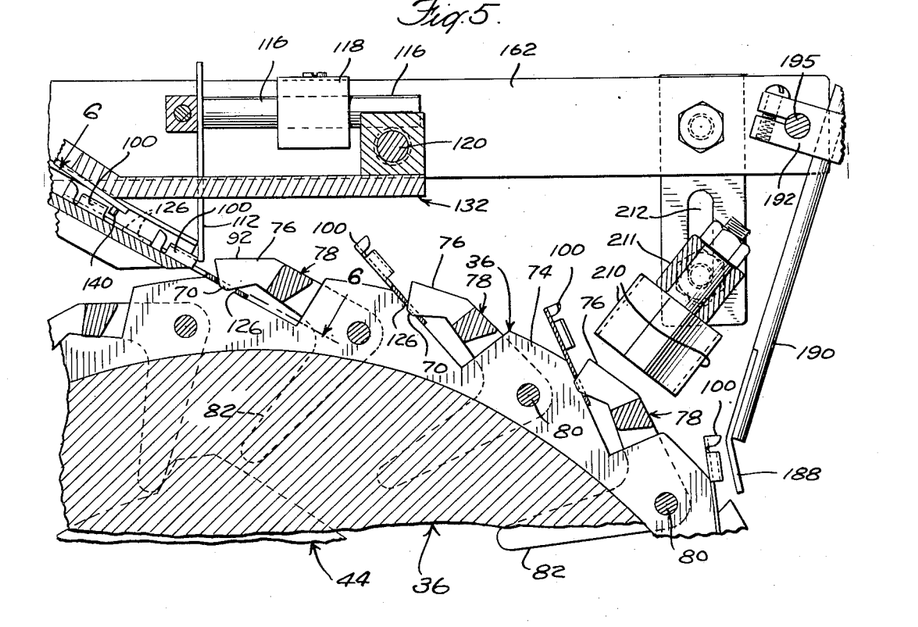
Figure 5 is a fragmentary view in central vertical section showing the uppermost portion of the carrier disc and adjacent mechanism for feeding and orienting the work on the carrier disc.
Figure 6:
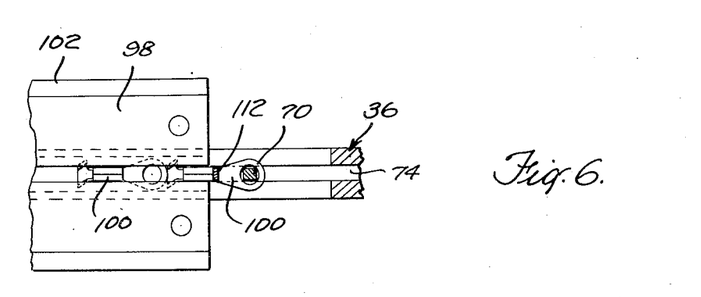
Figure 6 is a fragmentary view taken on line 6—6 of Figure 5.
Figure 7:
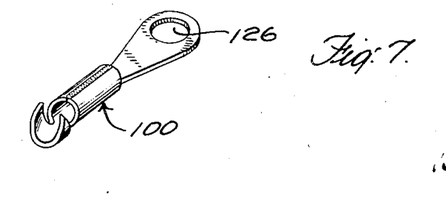
Figure 7 is a perspective view of a completed electrical terminal after passage through the machine shown in the other figures.

From the foregoing description, the mode of operation of the device will readily be understood. As hereinabove pointed out, the raceway 98 is filled with terminals to be brazed, with the connector portion (i. e., the tongue in the type shown in Figure 4) of each terminal extending downward in the raceway. With the driving wheel 30 constantly rotating and slowly effecting the reciprocation of the connecting rod 60 through the crank pin 58 on the pitman wheel 56, a step-by-step turning of the carrier 36 will be effected as the pawl 66 is driven back and forth, alternately engaging and riding over the ratchet 44. As the carrier 36 is thus turned in a step-by-step manner, the successive terminal clamps 70 mounted thereon will be brought into terminal-receiving position under the raceway 98.

As the carrier 36 moves to this position, the cam 96 moves with it, but on the return stroke of the rocker 64, the cam 96 moves its nose D under the arm 82 to open the clamp 70 for reception of a terminal, and at the same time, through the connected arm 84 to lift the stop 132 and allow the line of terminals to slide down against the terminal positioning retainer 112. As the rocker 64 nears the end of its return travel the nose D on cam 96 passes beyond the arm 82 allowing it to drop back, under pull of the spring 86, and thereby closing the clamp 70 onto the lowermost terminal, while the return of the arm 84 allows the stop arm 132 to drop back into position where its pin 140 will hold the remaining terminals in the raceway 98.

When the carrier 36 moves again the clamp 70 carries the terminal 100 with it, pushing the retaining finger 112 ahead of the terminal against the pull of the weight 118. As the clamped terminal moves away from the raceway, the next terminal moves down against the pin 140 into position to be delivered to the next clamp during the next operation of the cam 96.

Each clamped terminal will have its ferrule projecting from the periphery of the carrier 36, as it is carried from the raceway toward the point of brazing, and, as it passes the straightener 210, it will be so aligned that, after heating, its seam will meet the brazing wire 34 in good alignment. Thus as it comes into contact therewith on the next movement of the carrier, the wire will fuse and flow into the seam by the heat of the ferrule and will braze and seal the seam.

As above pointed out, the speed of rotation of the carrier 36 and the distance from the heating station F to the discharge station A are correlated to allow a suitable time for annealing of the ferrule, while the tongue is still protected from annealing heat by being clamped in the cold jaws of the terminal clamp. The annealing is concluded on release of the terminal at A by dropping it down the chute 209 into a quenching tank 208 as hereinabove described. From the discharge station A to the slope B on cam 96, the clamps 70 are held open, by the long dwell on the cam, so as to facilitate dissipation of heat absorbed from the heated terminal.

I claim:

1. A brazing machine which comprises a rotary carrier, a series of circumferentially spaced clamps pivotally mounted thereon, each having a bellcrank arm extending therefrom, springs urging the clamps against the carrier, reciprocating cams adapted to engage said bellcrank arms of clamps in receiving and discharging positions respectively, a raceway adjacent said receiving position for feeding a supply of articles to be brazed toward said carrier, a detent for holding said supply in the raceway and having a part adapted to be engaged by said clamp when opened in said receiving position, whereby to release said supply to allow an article to enter the clamp, funnel guides adjacent the path of said articles in the clamps beyond said receiving position, whereby to straighten the articles in said clamps, a heater adjacent the path of said articles for heating a portion thereof above brazing temperature, reciprocating pawl means for feeding a brazing strip, a guide adjacent said heating position for guiding the brazing strip into the path of that part of the article which is to be brazed, a feeler arm in the path of said articles when approaching the heating position, a movable guide for said pawl normally holding it out of strip-feeding engagement, said guide being connected to said feeler so as to be moved out of said supporting position when said feeler is moved by an article.

2. A brazing machine for brazing ferrules on connectors as defined in claim 1 wherein the clamp is adapted to hold the connector portion in conducting contact with a cold metal mass and the ferrule freely projecting and the heater is adapted to heat only the projecting portion and to heat it to annealing temperature, and a container for a quenching bath is provided beneath said release position.

3. In a brazing machine, the combination with a carrier having a defined path of movement and clamping means on said carrier for holding the article to be brazed, of: heating means so located along said path of movement that said article is presented in heat-receiving relation thereto, means arranged to present brazing material in position to be engaged by the part of the heated article which is to be brazed immediately after it leaves the heating means in its travel with the carrier, a raceway for holding the articles to be brazed and arranged to present the articles in position to be delivered to the clamping means, and in which automatic means are provided for opening the clamping means as it moves into article-receiving relation to the raceway and for closing it as it moves past said raceway, and article-retaining means associated with said raceway and arranged to be operated by said clamping means as it moves into and out of receiving relation to the raceway for effecting the delivery of a single article into said clamping means and the movement of a succeeding article into position to be delivered to the clamping means when it is next brought into receiving relation.

4. In a brazing machine, the combination with a rotatable carrier and a series of clamps circumferentially arranged thereon for successively receiving and holding articles to be brazed, of heating means so located along the path of travel of said clamping means that the articles held therein are successively presented in heat-receiving relation thereto, means for presenting brazing material in position to be engaged by the part of each heated article which is to be brazed immediately after it leaves the heating means in its travel with the carrier said means including means for feeding successive portions of the brazing material into engaging position as successive articles are moved past said heating means, a raceway for holding the articles to be brazed arranged at a point along the path of travel of the clamping means to deliver said articles to said clamping means, means for automatically opening each clamping means as it comes into receiving relation to said raceway and for automatically closing it after it has received the article, and means operated by the movement of each clamping means past the raceway for insuring the discharge from the raceway of only a single article for each clamping means.

5. In a brazing machine for automatically brazing the seam of a connector of the type integrally including a tongue portion and a ferrule portion embodying a seam to be brazed: a connector carrier constrained to travel through a predetermined path of carrier movement, a clamp on said carrier adapted to close upon and retain a connector tongue portion, a path of ferrule movement defined by the ferrule portion of a connector when carried by said clamp as said clamp moves along said path of carrier movement, a heating unit located on said path of ferrule movement defining a heating region traversed by said path of ferrule movement, a brazing material feed embodying a feed guide having a feeding axis which intersects said path of ferrule movement, and a connector supply including a supply passageway opening upon said path of carrier movement; said connector supply including a sensing device responsive to the presence of a connector, said carrier incorporating a clamp operating assembly disposed to close said clamp upon the tongue of a connector positioned at the end of said supply passageway when said clamp arrives in clamping relationship with such positioned connector, said brazing material feed incorporating control mechanism coordinated with said sensing device to provide a predetermined amount of brazing material in said path of ferrule movement, said heating region being located between the point on said path of ferrule movement where said clamp is closed on such tongue and the point where said predetermined amount of brazing material is positioned, and the heating capacity of said heating unit being at least sufficient to anneal the ferrule portion of a connector as it traverses said heating region and to raise it to at least a temperature at which it will melt brazing material upon contact.

6. In a brazing machine for automatically brazing the seam of a connector of the type integrally including a tongue portion and a ferrule portion embodying a seam to be brazed: a connector carrier constrained to travel through a predetermined path of carrier movement, a clamp on said carrier adapted to close upon and retain a connector tongue portion, a path of ferrule movement defined by the ferrule portion of a connector when carried by said clamp as said clamp moves along said path of carrier movement, a heating unit located on said path of ferrule movement defining a heating region traversed by said path of ferrule movement, a brazing material feed embodying a feed guide having a feeding axis intersecting said path of ferrule movement, and a connector supply including a supply passageway opening upon said path of carrier movement; said carrier incorporating a clamp operating assembly disposed to close said clamp upon the tongue of a connector positioned at the end of said supply passageway when said clamp arrives in clamping relationship with such positioned connector, said heating region being located on said path of ferrule movement beyond the point where said clamp is closed upon such tongue, a subassembly forming a part of said clamp operating assembly operative upon the clamp at a point on said path of carrier movement beyond said heating region and beyond the intersection of the brazing material feeding axis with said path of carrier movement to open said clamp, said carrier having good heat conducting properties, and said path of carrier movement including a portion where said carrier is enabled to dissipate heat acquired while passing through said heating region.

JOHN R. VICKERY.

REFERENCES CITED

The following references are of record in the file of this patent:

UNITED STATES PATENTS

| Number | Name | Date |
| --- | --- | --- |
| 941,147 | Holloway | Nov. 23, 1909 |
| 993,195 | Phelps | May 23, 1911 |
| 1,371,262 | Pryde | Mar. 15, 1921 |
| 1,457,504 | Cullen et al. | June 5, 1923 |
| 1,493,035 | Gueritey | May 6, 1924 |
| 1,615,591 | Mallory | Jan. 25, 1927 |
| 1,743,755 | Casella | Jan. 14, 1930 |
| 1,938,387 | Irwine | Dec. 5, 1933 |
| 2,057,037 | Kronquest | Oct. 13, 1936 |
| 2,275,163 | Thomas | Mar. 3, 1942 |
| 2,303,467 | Inskeep | Dec. 1, 1942 |
| 2,347,713 | Rogoff | May 2, 1944 |